(12) United States Patent
Menendez-Pidal et al.

(10) Patent No.: US 7,467,086 B2
(45) Date of Patent: Dec. 16, 2008

(54) METHODOLOGY FOR GENERATING ENHANCED DEMIPHONE ACOUSTIC MODELS FOR SPEECH RECOGNITION

(75) Inventors: Xavier Menendez-Pidal, Los Gatos, CA (US); Lex S. Olorenshaw, Half Moon Bay, CA (US); Gustavo Hernandez Abrego, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 666 days.

(21) Appl. No.: 11/013,888

(22) Filed: Dec. 16, 2004

(65) Prior Publication Data

US 2006/0136209 A1  Jun. 22, 2006

(51) Int. Cl.
*G10L 15/28* (2006.01)
*G10O 15/06* (2006.01)

(52) U.S. Cl. .................. 704/255; 704/243; 704/244; 704/254

(58) Field of Classification Search ................ 704/254, 704/255, 256, 256.1–256.8
See application file for complete search history.

(56) References Cited

U.S. PATENT DOCUMENTS

| | | | | |
|---|---|---|---|---|
| 5,345,537 A * | 9/1994 | Tanaka | | 704/255 |
| 5,440,663 A * | 8/1995 | Moese et al. | | 704/255 |
| 5,459,809 A * | 10/1995 | Kim et al. | | 382/160 |
| 6,151,574 A | 11/2000 | Lee et al. | | |
| 6,285,981 B1 * | 9/2001 | Kao | | 704/256 |
| 6,665,641 B1 * | 12/2003 | Coorman et al. | | 704/260 |
| 7,089,183 B2 * | 8/2006 | Gong | | 704/244 |
| 7,275,034 B2 * | 9/2007 | Odell et al. | | 704/255 |
| 2002/0046017 A1 * | 4/2002 | Kempe | | 704/1 |
| 2004/0111266 A1 * | 6/2004 | Coorman et al. | | 704/260 |
| 2004/0172249 A1 * | 9/2004 | Taylor et al. | | 704/260 |

OTHER PUBLICATIONS

Marino, J. et al. "The Demiphone: An Efficient Subword Unit for Continuous Speech Recognition," 1997, Proc. Eurospeech '97. http://citeseer.ist.psu.edu/71960.html.*

Marino, J. et al. "The Demiphone Versus the Triphone in a Decision-tree State-Tying Framework," in ICSLP-1998, paper 0250.*

Stolcke A. et al. "Hidden Markov Model Induction by Bayesian Model Merging" In Advances in Neural Information Processing Systems, vol. 5. Morgan Kaufmann, 1992. http://citeseer.ist.psu.edu/stolcke93hidden.html.*

* cited by examiner

*Primary Examiner*—Patrick N Edouard
*Assistant Examiner*—Douglas C Godbold
(74) *Attorney, Agent, or Firm*—Gregory J. Koerner; Redwood Patent Law

(57) ABSTRACT

A system and method for effectively performing speech recognition procedures includes enhanced demiphone acoustic models that a speech recognition engine utilizes to perform the speech recognition procedures. The enhanced demiphone acoustic models each have three states that are collectively arranged to form a preceding demiphone and a succeeding demiphone. An acoustic model generator may utilize a decision tree for analyzing speech context information from a training database. The acoustic model generator then effectively configures each of the enhanced demiphone acoustic models as either a succeeding-dominant enhanced demiphone acoustic model or a preceding-dominant enhanced demiphone acoustic model to accurately model speech characteristics.

14 Claims, 10 Drawing Sheets

Fig. 4                    410

METHODOLOGY FOR GENERATING ENHANCED DEMIPHONE ACOUSTIC MODELS FOR SPEECH RECOGNITION

BACKGROUND SECTION

1. Field of Invention

This invention relates generally to electronic speech recognition systems, and relates more particularly to a methodology for generating enhanced demiphone acoustic models for speech recognition.

2. Background

Implementing robust and effective techniques for system users to interface with electronic devices is a significant consideration of system designers and manufacturers. Voice-controlled operation of electronic devices often provides a desirable interface for system users to control and interact with electronic devices. For example, voice-controlled operation of an electronic device may allow a user to perform other tasks simultaneously, or can be advantageous in certain types of operating environments. In addition, hands-free operation of electronic devices may also be desirable for users who have physical limitations or other special requirements.

Hands-free operation of electronic devices may be implemented by various speech-activated electronic devices. Speech-activated electronic devices advantageously allow users to interface with electronic devices in situations where it would be inconvenient or potentially hazardous to utilize a traditional input device. However, effectively implementing such speech recognition systems creates substantial challenges for system designers.

For example, enhanced demands for increased system functionality and performance require more system processing power and require additional memory resources. An increase in processing or memory requirements typically results in a corresponding detrimental economic impact due to increased production costs and operational inefficiencies.

Furthermore, enhanced system capability to perform various advanced operations provides additional benefits to a system user, but may also place increased demands on the control and management of various system components. Therefore, for at least the foregoing reasons, implementing a robust and effective method for a system user to interface with electronic devices through speech recognition remains a significant consideration of system designers and manufacturers.

SUMMARY

In accordance with the present invention, a methodology is disclosed for generating enhanced demiphone acoustic models for speech recognition. In one embodiment, a phone set of specific phones are selectively defined for utilization by a speech recognition engine to perform various speech recognition procedures. In addition, a representative training database is created or provided by utilizing any effective techniques. Then, an acoustic model generator or other appropriate entity analyzes the training database to generate a separate decision tree for each state of acoustic models that represent the defined phone set.

Next, the acoustic model generator analyzes the decision trees to define appropriate dominance configurations for corresponding enhanced demiphone acoustic models. In certain embodiments, the foregoing configurations include a preceding-dominant enhanced demiphone configuration and a succeeding-dominant enhanced demiphone configuration. The acoustic model generator then implements the enhanced demiphone acoustic models using the dominance configurations previously defined.

In certain embodiments, the succeeding-dominant (right-dominant) enhanced demiphone includes a preceding (left) demiphone with relatively fewer states (e.g. one or zero states) and a succeeding (right) demiphone with relatively more states (e.g. two or three states). In addition, the preceding-dominant (left-dominant) enhanced demiphone includes a preceding (left) demiphone with relatively more states (e.g. two or three states) and a succeeding (right) demiphone with relatively fewer states (zero or one state). The speech recognition engine may then utilize the enhanced demiphone acoustic models to accurately and efficiently perform speech recognition procedures. For at least the foregoing reasons, the present invention therefore provides an improved system and method for generating enhanced demiphone acoustic models for speech recognition.

DETAILED DESCRIPTION

The present invention relates to an improvement in speech recognition systems. The following description is presented to enable one of ordinary skill in the art to make and use the invention, and is provided in the context of a patent application and its requirements. Various modifications to the embodiments disclosed herein will be apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for effectively performing speech recognition procedures, and includes enhanced demiphone acoustic models that a speech recognition engine utilizes to perform the speech recognition procedures. The enhanced demiphone acoustic models each have three states that are collectively arranged to form a left demiphone and a right demiphone. An acoustic model generator utilizes a decision tree for analyzing speech context information from a training database. To accurately model speech characteristics, the acoustic model generator then configures each of the enhanced demiphone acoustic models as either a right-dominant enhanced demiphone acoustic model or a left-dominant enhanced demiphone acoustic model.

Figure 1:
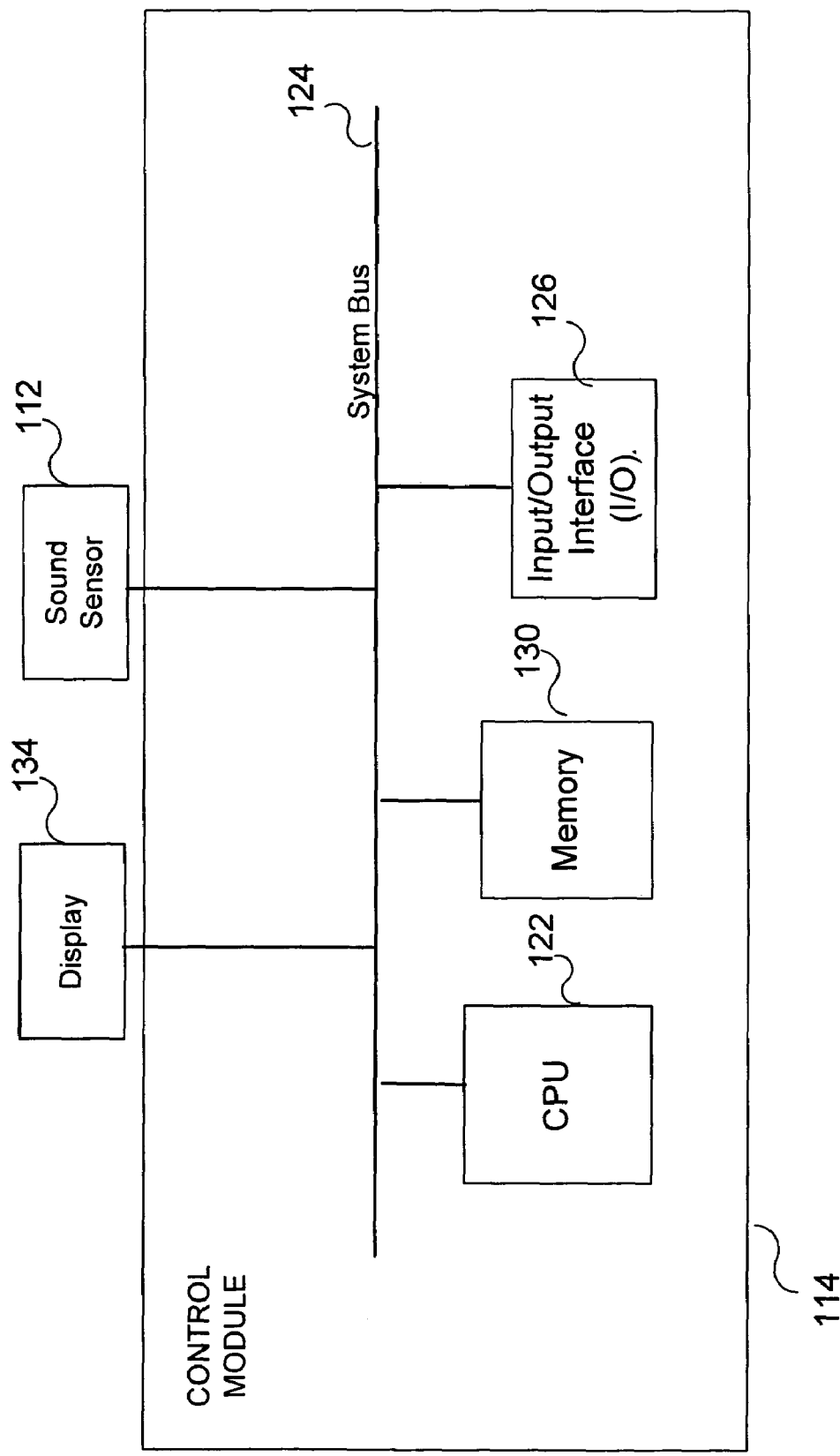
FIG. 1 is a block diagram for one embodiment of an electronic device, in accordance with the present invention.

Referring now to FIG. 1, a block diagram for one embodiment of an electronic device 110 is shown, according to the present invention. The FIG. 1 embodiment includes, but is not limited to, a sound sensor 112, a control module 114, and a display 134. In alternate embodiments, electronic device 110 may readily include various other elements or functionalities in addition to, or instead of, certain elements or functionalities discussed in conjunction with the FIG. 1 embodiment.

In accordance with certain embodiments of the present invention, electronic device 110 may be embodied as any appropriate electronic device or system. For example, in certain embodiments, electronic device 110 may be implemented as a computer device, a personal digital assistant (PDA), a cellular telephone, a television, a game console, and as part of entertainment robots such as AIBO™ and QRIO™ by Sony Corporation.

In the FIG. 1 embodiment, electronic device 110 utilizes sound sensor 112 to detect and convert ambient sound energy into corresponding audio data. The captured audio data is then transferred over system bus 124 to CPU 122, which responsively performs various processes and functions with the captured audio data, in accordance with the present invention.

In the FIG. 1 embodiment, control module 114 includes, but is not limited to, a central processing unit (CPU) 122 (electronic data processor), a memory 130, and one or more input/output interface(s) (I/O) 126. Display 134, CPU 122, memory 130, and I/O 126 are each coupled to, and communicate, via common system bus 124. In alternate embodiments, control module 114 may readily include various other components in addition to, or instead of, those components discussed in conjunction with the FIG. 1 embodiment.

In the FIG. 1 embodiment, CPU 122 is implemented to include any appropriate microprocessor device. Alternately, CPU 122 may be implemented using any other appropriate technology. For example, CPU 122 may be implemented as an application-specific integrated circuit (ASIC) or other appropriate electronic device. In the FIG. 1 embodiment, I/O 126 provides one or more effective interfaces for facilitating bi-directional communications between electronic device 110 and any external entity, including a system user or another electronic device. I/O 126 may be implemented using any appropriate input and/or output devices. The functionality and utilization of electronic device 110 are further discussed below in conjunction with FIGS. 2-10.

Figure 2:
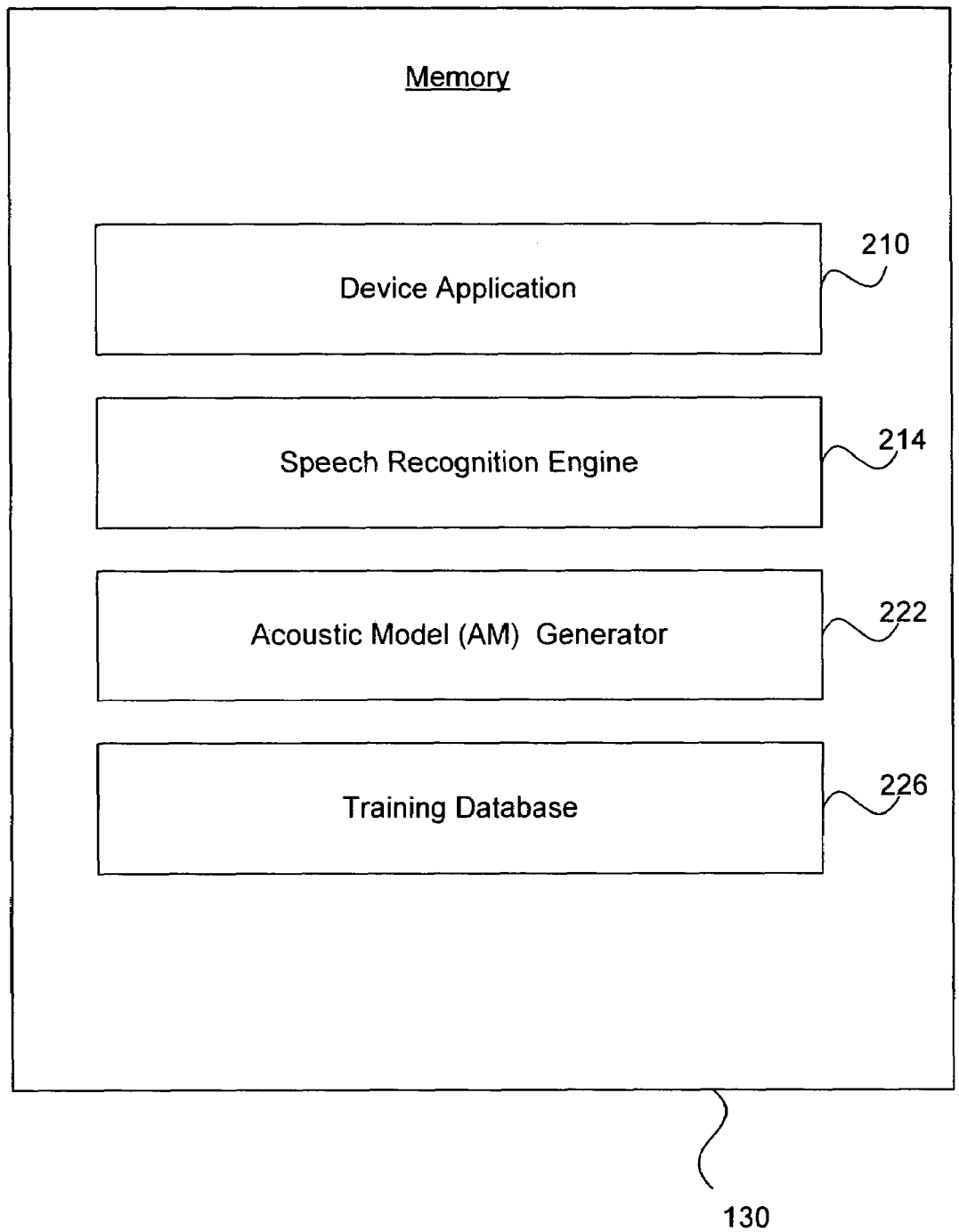
FIG. 2 is a block diagram for one embodiment of the memory of FIG. 1, in accordance with the present invention.

Referring now to FIG. 2, a block diagram for one embodiment of the FIG. 1 memory 130 is shown, according to the present invention. Memory 130 may comprise any desired storage-device configurations, including, but not limited to, random access memory (RAM), read-only memory (ROM), and storage devices such as floppy discs or hard disc drives, and SONY® MEMORY STICK®. In the FIG. 2 embodiment, memory 130 stores a device application 210, a speech recognition engine 214, an acoustic model (AM) generator 222, and a training database 226. In alternate embodiments, memory 130 may readily store other elements or functionalities in addition to, or instead of, certain elements or functionalities discussed in conjunction with the FIG. 2 embodiment.

In the FIG. 2 embodiment, device application 210 includes program instructions that are executed by CPU 122 (FIG. 1) to perform various functions and operations for electronic device 110. The particular nature and functionality of device application 210 typically varies depending upon factors such as the type and particular use of the corresponding electronic device 110.

In the FIG. 2 embodiment, speech recognition engine 214 includes one or more software modules that are executed by CPU 122 to analyze and recognize input sound data. Certain embodiments of speech recognition engine 214 are further discussed below in conjunction with FIGS. 3-4. In the FIG. 2 embodiment, electronic device 110 may utilize AM generator 222 to generate enhanced demiphone acoustic models for use by speech recognition engine 214 in performing speech recognition procedures. In the FIG. 2 embodiment, training database 226 includes an extensive selection of representative recorded speech samples. The generation of enhanced demiphone acoustic models by AM generator 222 is further discussed below in conjunction with FIGS. 7-10.

Figure 3:
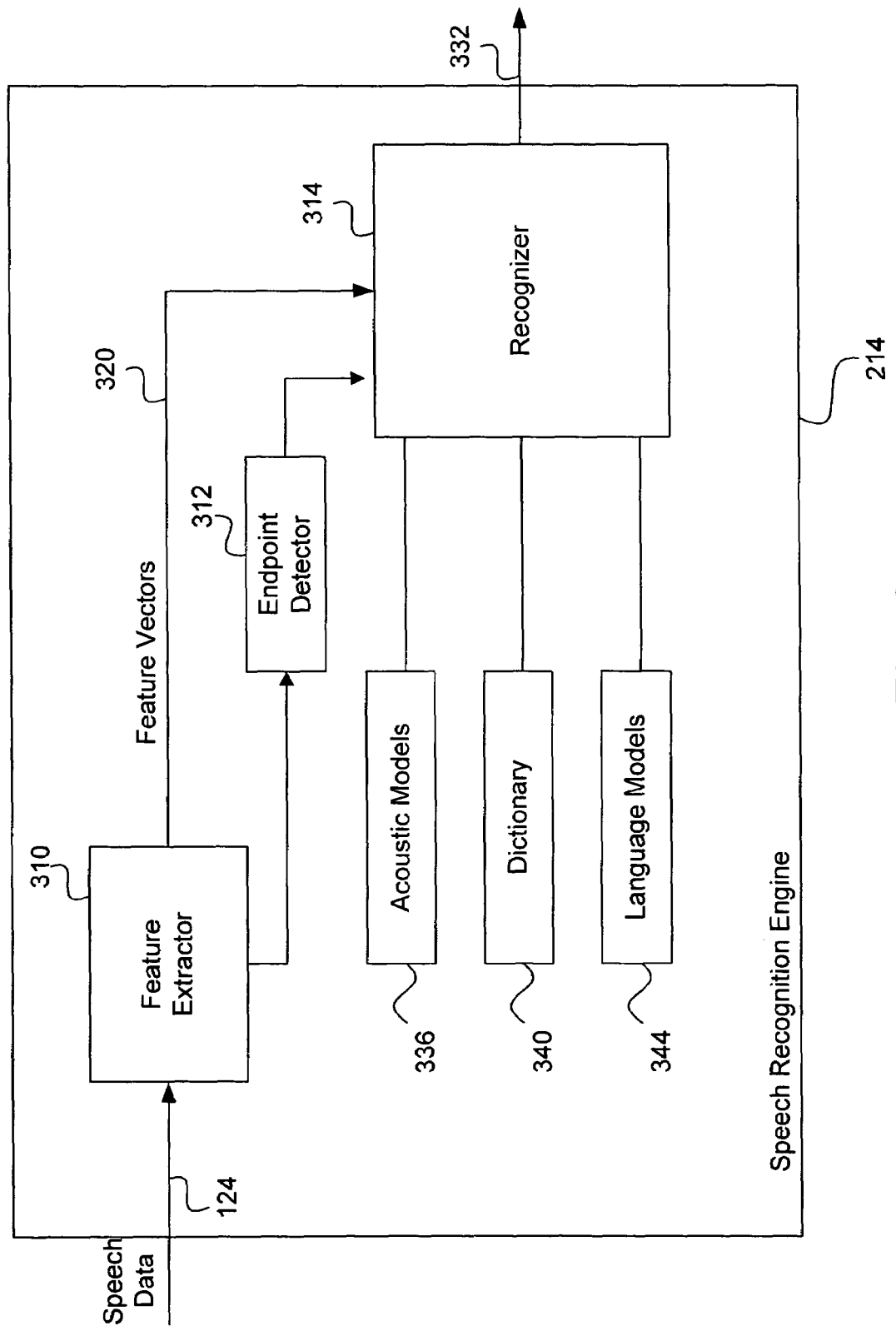
FIG. 3 is a block diagram for one embodiment of the speech recognition engine of FIG. 2, in accordance with the present invention.

Referring now to FIG. 3, a block diagram for one embodiment of the FIG. 2 speech recognition engine 214 is shown, in accordance with the present invention. Speech recognition engine 214 includes, but is not limited to, a feature extractor 310, an endpoint detector 312, a recognizer 314, acoustic models 336, dictionary 340, and language models 344. In alternate embodiments, speech recognition engine 214 may readily include various other elements or functionalities in addition to, or instead of, certain elements or functionalities discussed in conjunction with the FIG. 3 embodiment.

In the FIG. 3 embodiment, sound sensor 112 (FIG. 1) provides digital speech data to feature extractor 310 via system bus 124. Feature extractor 310 responsively generates corresponding representative feature vectors, which are provided to recognizer 314 via path 320. Feature extractor 310 further provides the speech data to endpoint detector 312, and endpoint detector 312 responsively identifies endpoints of utterances represented by the speech data to indicate the beginning and end of an utterance in time. Endpoint detector 312 then provides the endpoints to recognizer 314.

In the FIG. 3 embodiment, recognizer 314 is configured to recognize words in a vocabulary that is represented in dictionary 340. The vocabulary represented in dictionary 340 corresponds to any desired sentences, word sequences, commands, instructions, narration, or other audible sounds that are supported for speech recognition by speech recognition engine 214.

In practice, each word from dictionary 340 is associated with a corresponding phone string (string of individual phones) which represents the pronunciation of that word. Acoustic models 336 (such as Hidden Markov Models) for each of the phones are selected and combined to create the foregoing phone strings for accurately representing pronunciations of words in dictionary 340. In accordance with the present invention, acoustic models 336 are implemented as enhanced demiphone acoustic models. Recognizer 314 compares input feature vectors from line 320 with the entries (phone strings) from dictionary 340 to determine which word produces the highest recognition score. The word corresponding to the highest recognition score may thus be identified as the recognized word.

Speech recognition engine 214 also utilizes language models 344 as a recognition grammar to determine specific recognized word sequences that are supported by speech recognition engine 214. The recognized sequences of vocabulary words may then be output as recognition results from recognizer 314 via path 332. The operation and implementation of recognizer 314, dictionary 340, and language models 344 are further discussed below in conjunction with FIG. 4.

Figure 4:
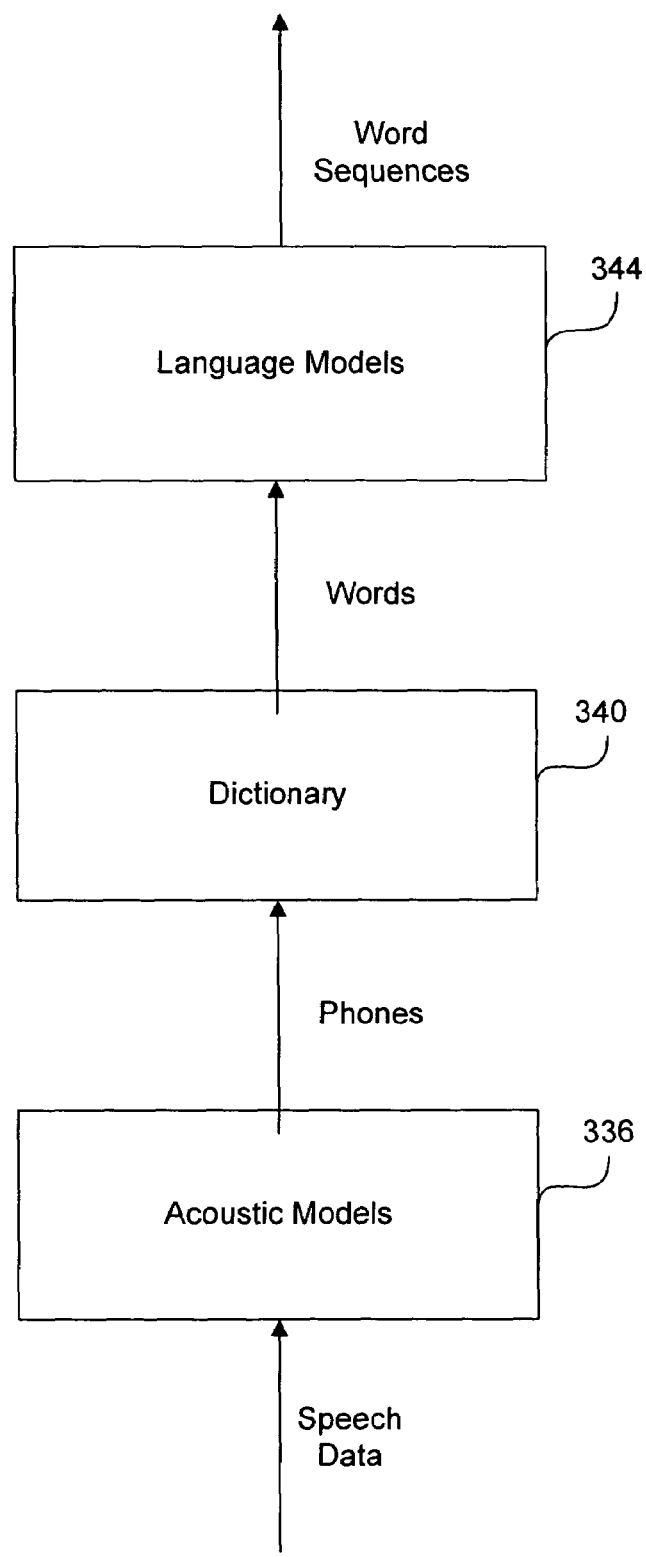
FIG. 4 is a block diagram illustrating functionality of the speech recognition engine of FIG. 3, in accordance with one embodiment of the present invention.

Referring now to FIG. 4, a block diagram illustrating functionality of the FIG. 3 speech recognition engine 214 is shown, in accordance with one embodiment of the present invention. In alternate embodiments, the present invention may readily perform speech recognition procedures using various techniques or functionalities in addition to, or instead of, certain techniques or functionalities discussed in conjunction with the FIG. 4 embodiment.

In the FIG. 4 embodiment, speech recognition engine 214 receives speech data from sound sensor 112, as discussed above in conjunction with FIG. 3. Recognizer 314 (FIG. 3) from speech recognition engine 214 sequentially compares segments of the input speech data with acoustic models 336 to identify a series of phones (phone strings) that represent the input speech data. In accordance with the present invention, acoustic models 336 are implemented as enhanced demiphone acoustic models, as discussed below in conjunction with FIGS. 7-10.

Recognizer 314 references dictionary 340 to look up recognized vocabulary words that correspond to the identified phone strings. The recognizer 314 then utilizes language models 344 as a recognition grammar to form the recognized vocabulary words into word sequences, such as sentences, phrases, commands, or narration, which are supported by speech recognition engine 214. Various techniques for effectively generating enhanced demiphone acoustic models are further discussed below in conjunction with FIGS. 7-10.

Figure 5:
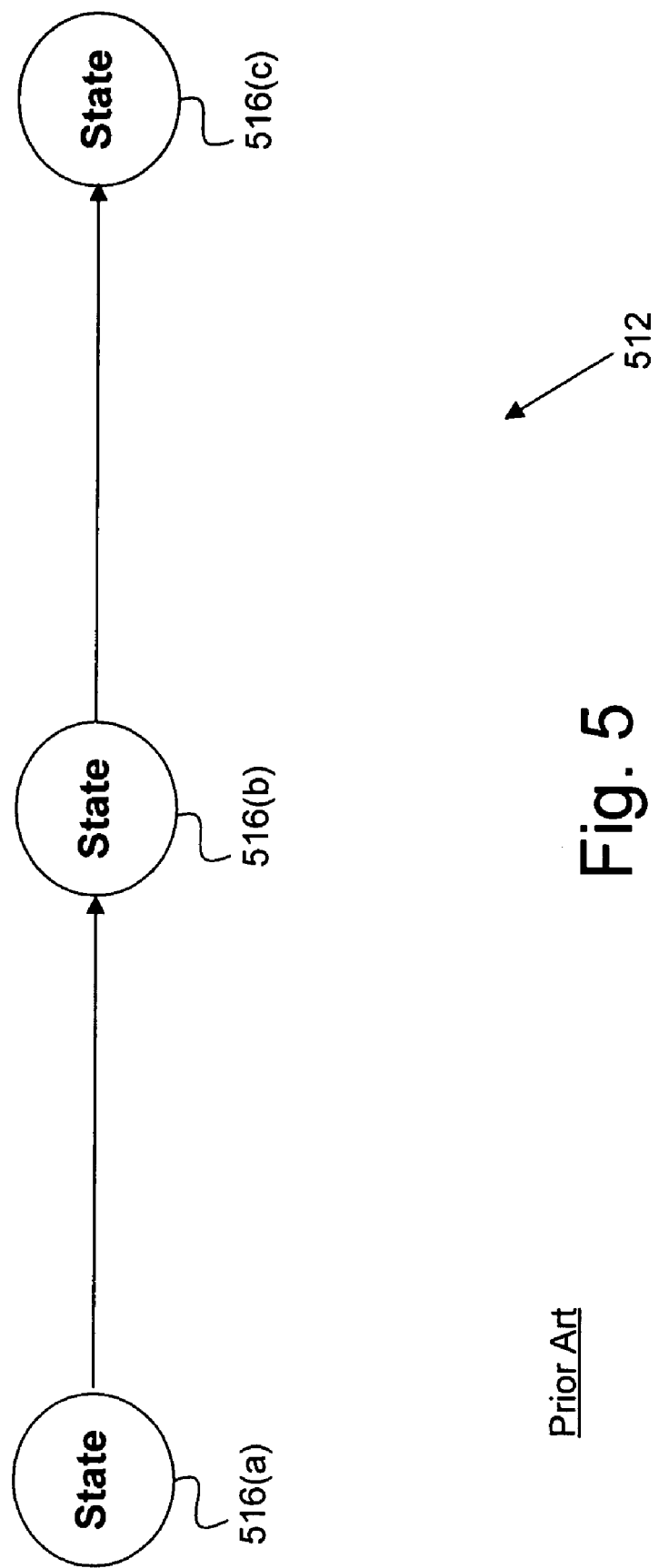
FIG. 5 is a diagram for one embodiment of a triphone acoustic model.

Referring now to FIG. 5, a diagram for one embodiment of a triphone acoustic model (AM) 512 is shown. In the FIG. 5 embodiment, triphone AM 512 represents a given phone from a supported phone set that is used to implement a speech recognition engine. Triphone AM 512 includes a first state 516(a), a second state 516(b), and a third state 516(c) that collectively model the corresponding phone in a temporal sequence that progresses from left to right as depicted in the FIG. 5 embodiment.

Each state 516 of triphone AM 512 is defined with respect to a phone context that includes information from both a preceding phone and a succeeding phone. In other words, all three states 516 of the current phone that is modeled by triphone AM 512 are based upon context information from both an immediately preceding phone and an immediately succeeding phone.

Because triphone AM 512 is implemented with three discrete states, in order to implement a phone set with a given number of phones "X", the total number of triphone AMs 512 required by a corresponding speech recognition engine is expressed by the following formula: Total Triphone AMs=$X^3$. Utilizing triphone AMs 512 for performing speech recognition procedures may therefore require a relatively large amount of memory and processing resources.

Figure 6:
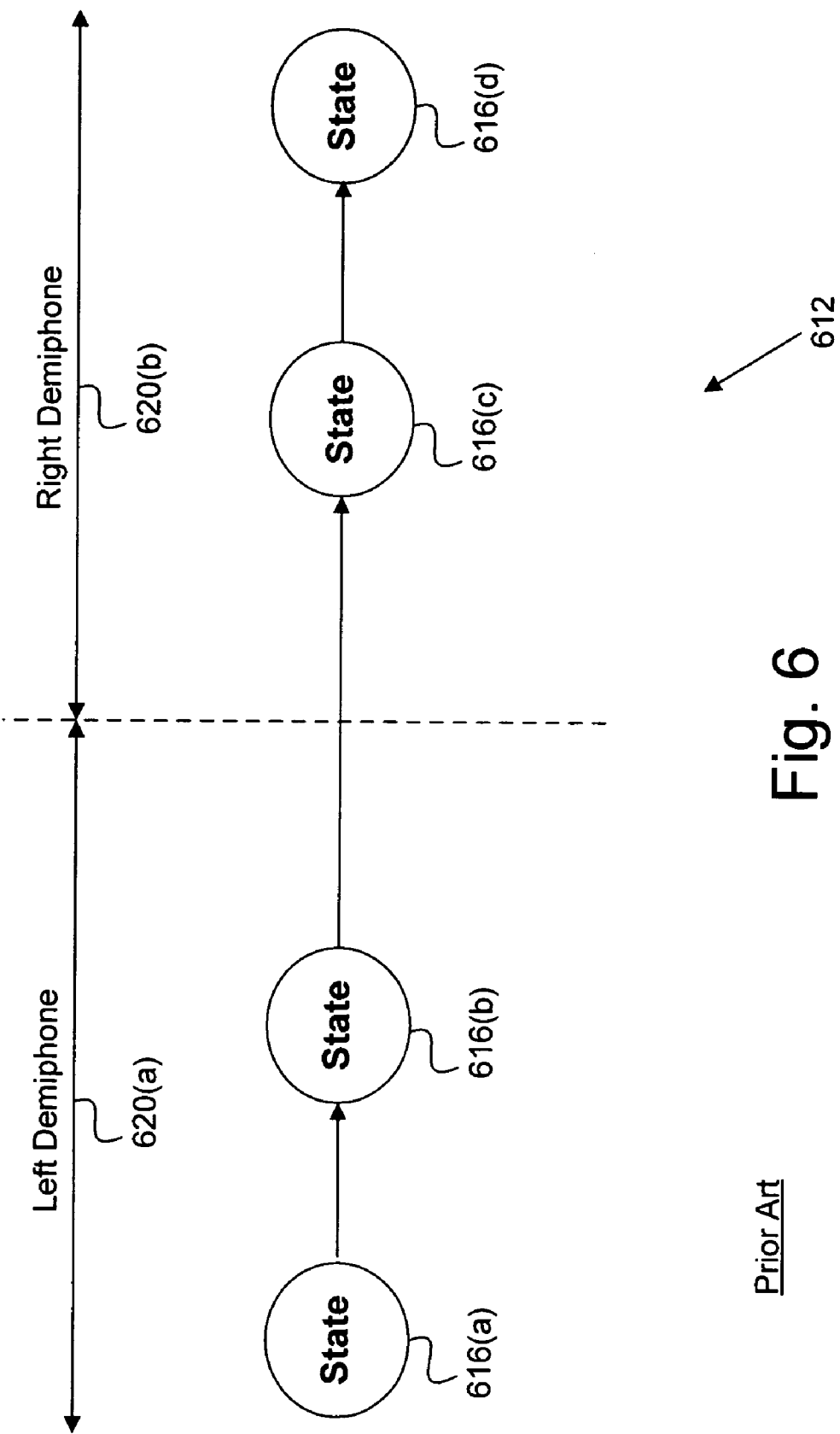
FIG. 6 is a diagram for one embodiment of a conventional demiphone acoustic model.

Referring now to FIG. 6, a diagram for one embodiment of a conventional demiphone acoustic model (AM) 612 is shown. In the FIG. 6 embodiment, conventional demiphone AM 612 represents a given phone from a supported phone set that is used to implement a speech recognition engine. Conventional demiphone AM 612 includes a conventional left demiphone 620(a) and a conventional right demiphone 620(b). The conventional left demiphone 620(a) in turn includes a first state 616(a) and a second state 616(b), while conventional right demiphone 620(b) includes a third state 616(c) and a fourth state 616(d). First state 616(a), second state 616(b), third state 616(c), and fourth state 616(d) collectively model the corresponding phone in a temporal sequence that progresses from left to right as depicted in the FIG. 6 embodiment.

Each state 616(a) and 616(b) of conventional left demiphone AM 620(a) is defined with respect to a phone context that includes information only from a preceding phone. Similarly, each state 616(c) and 616(d) of conventional right demiphone AM 620(b) is defined with respect to a phone context that includes information from only a succeeding phone. In other words, left demiphone 620(a) of conventional demiphone AM 612 is based only upon context information from an immediately preceding phone with respect to the current phone that is modeled by conventional demiphone AM 612, and right demiphone 620(b) of conventional demiphone AM 612 is based only upon context information from an immediately succeeding phone with respect to the current phone that is modeled by conventional demiphone AM 612.

Because conventional demiphone AM 612 is implemented with two discrete demiphones 620, in order to implement a phone set with a given number of phones "X", the total number of conventional demiphone AMs 612 required by a corresponding speech recognition engine is expressed by the following formula: Total Demiphone AMs=$2*(X^2)$. Utilizing conventional demiphone AMs 612 for performing speech recognition procedures may therefore conserve memory and processing resources as compared to a speech recognition system that utilizes triphone AMs 512 (FIG. 5).

However, because conventional demiphone AMs 612 utilize the same number of states 616 to implement both conventional left demiphone 620(a) and conventional right demiphone 620(b), an equal level of dominance is accorded to both the preceding phone and the succeeding phone. In actuality, during most speech contexts, the foregoing equal level of dominance does not accurately reflect true acoustic characteristics of speech. Therefore, conventional demiphone AMs 612 do not optimally model speech, and speech recognition procedures may exhibit reduced accuracy as a result. To address this problem, improved techniques for implementing enhanced demiphone acoustic models are discussed below in conjunction with FIGS. 7-10.

Figure 7:
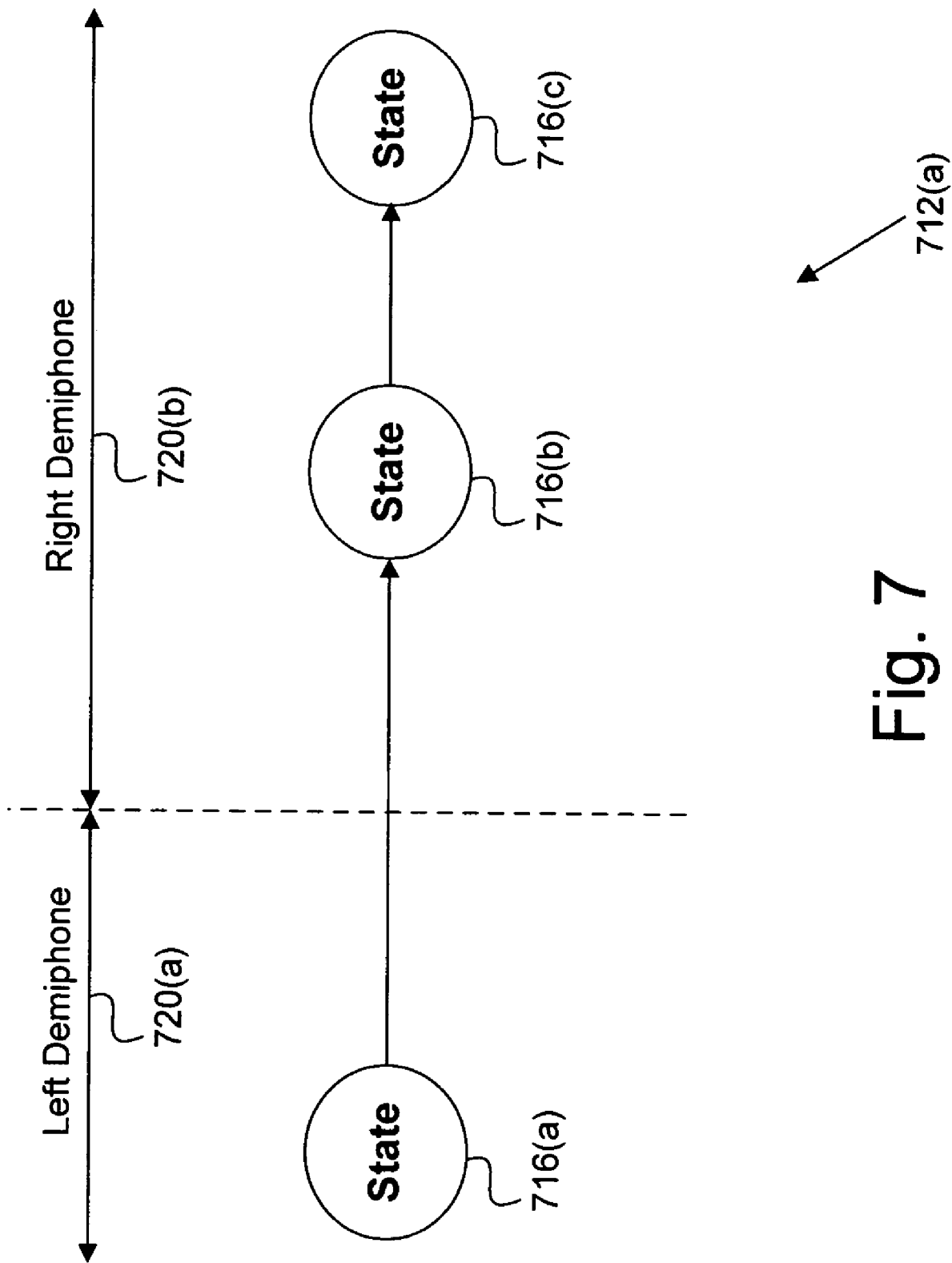
FIG. 7 is a diagram for one embodiment of a right-dominant enhanced demiphone acoustic model, in accordance with the present invention.

Referring now to FIG. 7, a diagram for one embodiment of a right-dominant enhanced demiphone acoustic model (AM) 712(a) is shown, in accordance with one embodiment of the present invention. In alternate embodiments, various right-dominant enhanced demiphone AMs 712(a) may be implemented with configurations, elements, or functionalities in addition to, or instead of, certain configurations, elements, or functionalities discussed in conjunction with the FIG. 7 embodiment.

In the FIG. 7 embodiment, right-dominant enhanced demiphone AM 712(a) represents a given phone from a supported phone set that is used to implement acoustic models 336 and dictionary 340 from speech recognition engine 214, as discussed above in conjunction with FIGS. 3 and 4. Right-dominant enhanced demiphone AM 712(a) includes a left demiphone 720(a) and a right demiphone 720(b). The left demiphone 720(a) in turn includes only a first state 716(a), while right demiphone 720(b) includes a second state 716(b) and a third state 716(c). First state 716(a), second state 716(b), and third state 716(c) collectively model the corresponding phone in a temporal sequence that progresses from left to right as depicted in the FIG. 7 embodiment.

State 716(a) of left demiphone AM 720(a) is defined with respect to a phone context that includes information only from a preceding phone. Similarly, each state 716(b) and 716(c) of right demiphone AM 720(b) is defined with respect to a phone context that includes information from only a succeeding phone. In other words, left demiphone 720(a) of right-dominant enhanced demiphone AM 712(a) is based upon context information from only an immediately preceding phone with respect to the current phone that is modeled by right-dominant enhanced demiphone AM 712(a), and right demiphone 720(b) of right-dominant enhanced demiphone AM 712(a) is based upon context information from only an immediately succeeding phone with respect to the current phone that is modeled by right-dominant enhanced demiphone AM 712(a).

Because right-dominant enhanced demiphone AM 712(a) is implemented with two discrete demiphones 720, in order to implement a phone set with a given number of phones "X", the total number of enhanced demiphone AMs 712 required by a corresponding speech recognition engine 214 is expressed by the following formula: Total Demiphone AMs=2*($X^2$). Utilizing enhanced demiphone AMs 712(a) for performing speech recognition procedures may therefore conserve memory and processing resources as compared to a speech recognition system that utilizes triphone AMs 512 (FIG. 5).

In addition, because right-dominant demiphone AMs 712(a) utilize a different number of states 716 to implement left demiphone 720(a) and right demiphone 720(b), a different level of or context dominance is accorded to the preceding phone and the succeeding phone. Therefore, right-dominant enhanced demiphone AMs 712(a) may be advantageously utilized to optimally model certain phones for performing speech recognition procedures with increased accuracy characteristics. In certain embodiments, right-dominant demiphone AMs 712(a) may be effectively utilized to model all supported phones that are utilized by speech recognition engine 214. Techniques for implementing right-dominant enhanced demiphone AMs 712(a) are further discussed below in conjunction with FIGS. 9-10.

Figure 8:
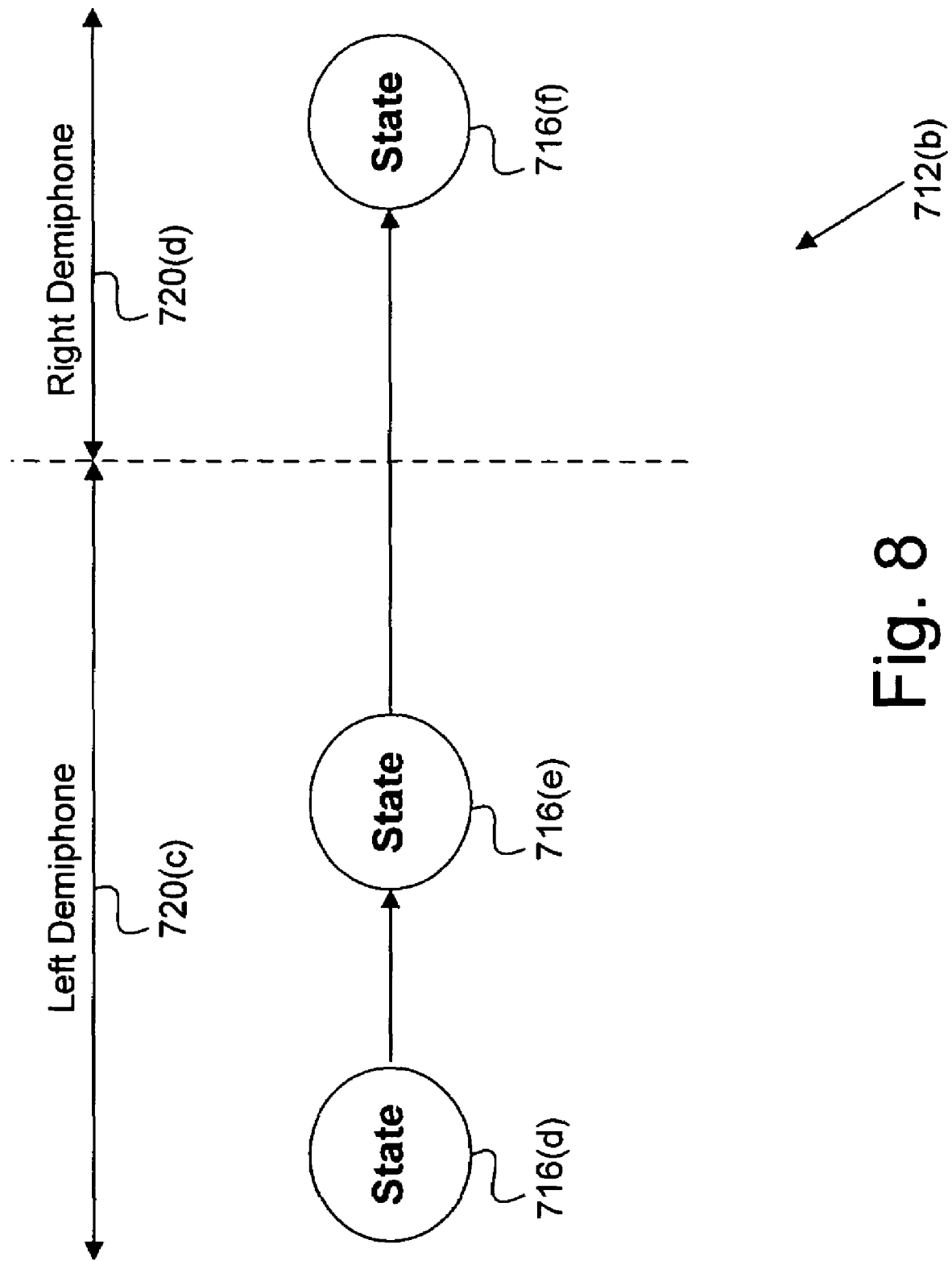
FIG. 8 is a diagram for one embodiment of a left-dominant enhanced demiphone acoustic model, in accordance with the present invention.

Referring now to FIG. 8, a diagram for one embodiment of a left-dominant enhanced demiphone acoustic model (AM) 712(b) is shown, in accordance with one embodiment of the present invention. In alternate embodiments, various left-dominant enhanced demiphone AMs 712(b) may be implemented with configurations, elements, or functionalities in addition to, or instead of, certain configurations, elements, or functionalities discussed in conjunction with the FIG. 8 embodiment.

In the FIG. 8 embodiment, left-dominant enhanced demiphone AM 712(b) represents a given phone from a supported phone set that is used to implement acoustic models 336 and dictionary 340 from speech recognition engine 214, as discussed above in conjunction with FIGS. 3 and 4. Left-dominant enhanced demiphone AM 712(b) includes a left demiphone 720(c) and a right demiphone 720(d). The left demiphone 720(c) in turn includes a first state 716(d) and a second state 716(e), while right demiphone 720(d) includes only a third state 716(f). First state 716(d), second state 716(e), and third state 716(f) collectively model the corresponding phone in a temporal sequence that progresses from left to right as depicted in the FIG. 8 embodiment.

Each state 716(d) and state 716(e) of left demiphone AM 720(c) are defined with respect to a phone context that includes information only from a preceding phone. Similarly, state 716(f) of right demiphone AM 720(d) is defined with respect to a phone context that includes information from only a succeeding phone. In other words, left demiphone 720(c) of left-dominant enhanced demiphone AM 712(b) is based upon context information from only an immediately adjacent preceding phone with respect to the current phone that is modeled by left-dominant enhanced demiphone AM 712(b), while right demiphone 720(d) of left-dominant enhanced demiphone AM 712(b) is based upon context information from only an immediately adjacent succeeding phone with respect to the current phone that is modeled by left-dominant enhanced demiphone AM 712(b).

Because left-dominant enhanced demiphone AM 712(b) is implemented with two discrete demiphones 720, in order to implement a phone set with a given number of phones "X", the total number of enhanced demiphone AMs 712 required by a corresponding speech recognition engine 214 may be expressed by the following formula: Total Demiphone AMs=2*($X^2$). Utilizing enhanced demiphone AMs 712(b) for performing speech recognition procedures may therefore conserve memory and processing resources when compared to a speech recognition system that utilizes triphone AMs 512 (FIG. 5).

In addition, because left-dominant demiphone AMs 712(b) utilize a different number of states 716 to implement the left demiphone 720(c) and right demiphone 720(d), a different level of or context dominance is accorded to the preceding phone and the succeeding phone. Therefore, left-dominant enhanced demiphone AMs 712(b) may be advantageously utilized to optimally model certain phones for performing speech recognition procedures with increased accuracy characteristics. Techniques for implementing left-dominant enhanced demiphone AMs 712(b) are further discussed below in conjunction with FIGS. 9-10.

Figure 9:
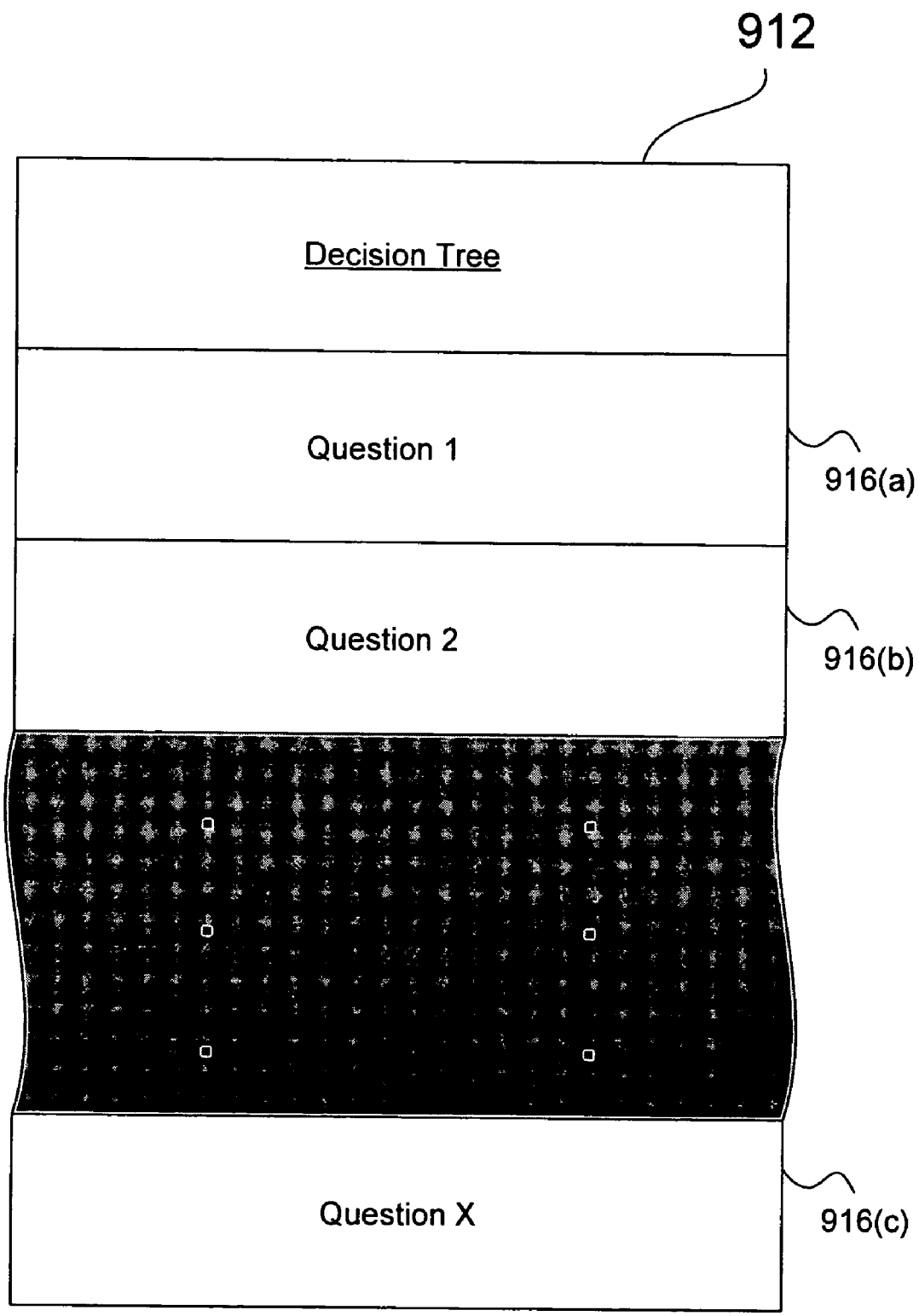
FIG. 9 is a diagram for one embodiment of a decision tree, in accordance with the present invention.

Referring now to FIG. 9, a block diagram for one embodiment of a decision tree 912 is shown, in accordance with the present invention. In alternate embodiments, various types of decision trees may include other elements or functionalities in addition to, or instead of, certain elements or functionalities discussed in conjunction with the FIG. 9 embodiment.

In accordance with certain embodiments of the present invention, acoustic model (AM) generator 222 (FIG. 2) may utilize decision tree 912 to determine whether a given enhanced demiphone AM 712 should be configured either as a right-dominant enhanced demiphone AM 712(a) (FIG. 7), or as a left-dominant enhanced demiphone AM 712(b) (FIG. 8). In the FIG. 9 embodiment, decision tree 912 includes a question 1 (916(a)) through a question X (916(c)). Decision tree 912 may be implemented to include any desired number of questions 916 that may include any desired type of information.

In the FIG. 9 embodiment, a separate decision tree 912 may be created for each state of an acoustic model by analyzing linguistic characteristics and acoustic properties of the speech information in training database 226 (FIG. 2) to determine either a right-dominant configuration or a left-dominant configuration for that given enhanced demiphone AM 712 within a given context. Each question includes a phone characteristic (such as "voiced", "nasal", or "consonant"), and a corresponding dominance characteristic (such as "left" or "right").

A left dominance indicates primary influence from a preceding phone with respect to the current acoustic model, and a right dominance indicates primary influence from a succeeding phone with respect to the current acoustic model. In certain embodiments, decision tree 912 may be implemented as a triphone decision tree with questions 916 that are based upon the states of the triphone acoustic model 512 discussed above in conjunction with FIG. 5.

In accordance with the present invention, AM generator 222 (FIG. 2) or other appropriate entity may evaluate the dominance characteristics of all questions 916 for a given decision tree 912 to determine a composite dominance characteristic for a corresponding state 716 of an enhanced demiphone AM 712. After the dominance characteristic of each state 716 is determined, then AM generator 222 may appropriately configure the corresponding enhanced demiphone AM 712 as either a right-dominant enhanced demiphone AM 712(a), or a left-dominant enhanced demiphone AM 712(b). However, in certain other embodiments, decision tree 912 need not by utilized, and right-dominant demiphone AMs 712(a) may be effectively utilized to model all supported phones that are utilized by speech recognition engine 214.

The following Table I illustrates dominance characteristics for three states 716 of a selected phone set of 46 phones, as determined by analyzing corresponding decision trees 912. In accordance with the present invention, if the second center state 716 is listed as "right", then the corresponding enhanced demiphone AM 712 is configured as a right-dominant enhanced demiphone AM 712(a). Similarly, if the second center state 716 is listed as "left", then the corresponding enhanced demiphone AM 712 is configured as a left-dominant enhanced demiphone AM 712(b).

TABLE I

| Phone | 1st state | 2nd state | 3rd state |
| --- | --- | --- | --- |
| aa | left | right | right |
| ae | left | right | right |
| ah | left | left | right |
| ao | left | right | right |
| aw | left | left | right |
| ax | left | right | right |
| ay | left | left | right |
| b | left | right | right |
| ch | left | right | right |
| d | left | right | right |
| dh | left | left | right |
| eh | left | right | right |
| er | left | right | right |
| ey | left | right | right |
| f | left | right | right |
| g | left | right | right |
| hh | left | right | right |
| ih | left | left | right |
| ix | left | right | right |
| iy | left | right | right |
| jh | left | right | right |
| k | left | right | right |
| l | left | left | right |
| m | left | right | right |
| n | left | right | right |
| ng | left | right | right |
| ow | left | right | right |
| oy | left | monophone | right |
| p | left | right | right |
| r | left | left | right |
| s | left | right | right |
| sh | left | left | right |
| t | left | right | right |
| th | left | left | right |
| uh | left | left | left |
| uw | left | right | right |
| v | left | right | right |
| w | left | right | right |
| y | left | left | right |
| z | left | right | right |
| zh | monophone | monophone | monophone |
| cl (closure) | left | left | right |

Figure 10:
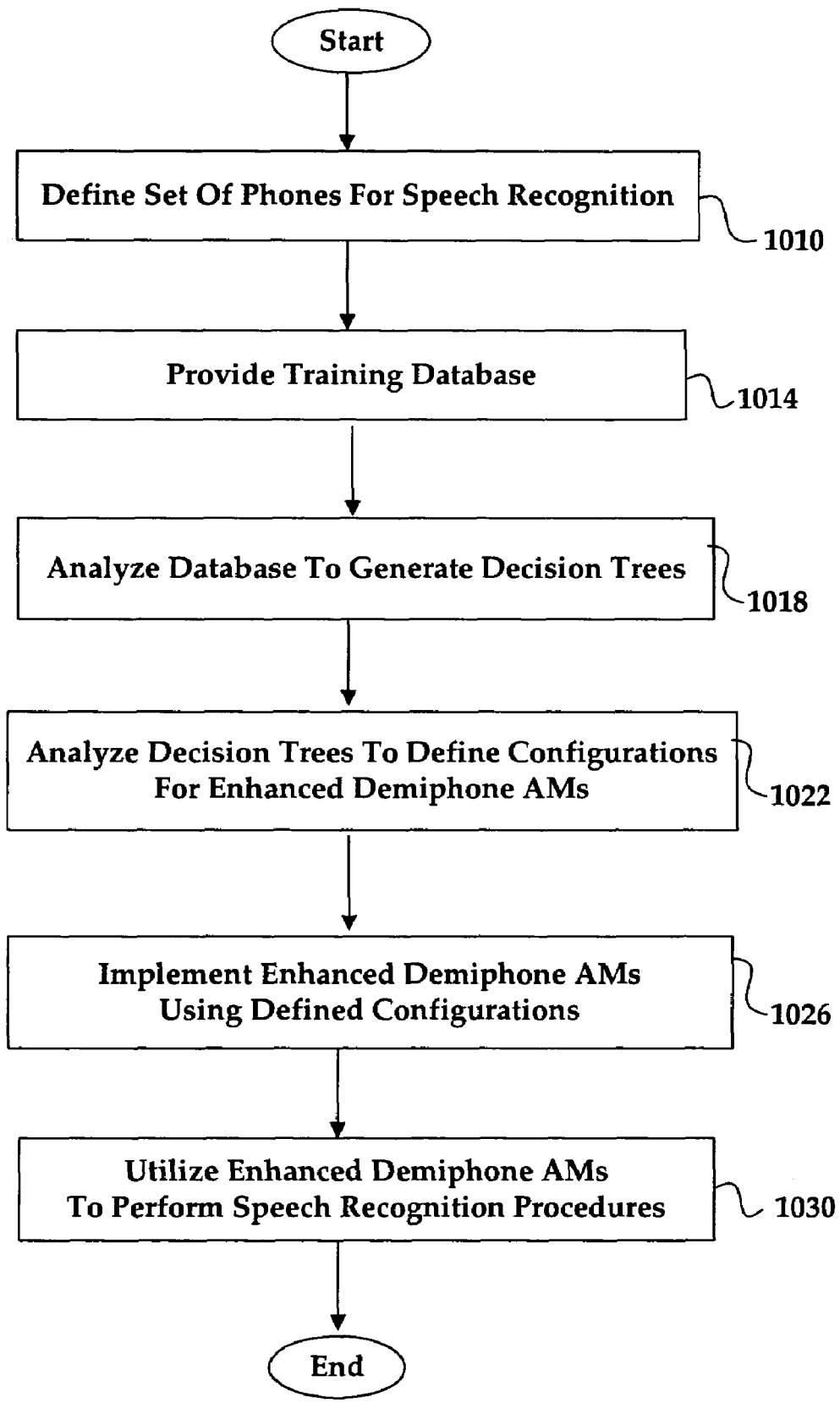
FIG. 10 is a flowchart of method steps for generating enhanced demiphone acoustic models for speech recognition, in accordance with one embodiment of the present invention.

Referring now to FIG. 10, a flowchart of method steps for generating enhanced demiphone acoustic models (AMs) 712 is shown, in accordance with one embodiment of the present invention. The FIG. 10 flowchart is presented for purposes of illustration, and in alternate embodiments, the present invention may readily utilize various steps and sequences other than certain of those discussed in conjunction with the FIG. 10 embodiment.

In the FIG. 10 embodiment, in step 1010, a phone set of specific phones are selectively defined for utilization by a speech recognition engine 214 to perform various speech recognition procedures. In addition, in step 1014, a representative training database 226 (FIG. 2) is created or provided by utilizing any effective techniques. In step 1018, an acoustic model generator 222 (FIG. 2) or other appropriate entity analyzes training database 226 to generate a separate decision tree 912 for each state of acoustic models that represent the defined phone set.

In step 1022, acoustic model generator 222 analyzes decision trees 912 to define appropriate dominance configurations for corresponding enhanced demiphone acoustic models 712. In certain embodiments, the foregoing configurations include a right-dominant enhanced demiphone configuration (see FIG. 7), and a left-dominant enhanced demiphone configuration (see FIG. 8). Next, in step 1026, acoustic model generator 222 implements the enhanced demiphone acoustic models 712 using the dominance configurations previously defined in step 1022. Finally, in step 1030, speech recognition engine 214 may then utilize the enhanced demiphone acoustic models 712 to accurately and efficiently perform speech recognition procedures. The FIG. 10 process may then terminate. The present invention therefore provides an improved system and method for generating enhanced demiphone acoustic models for speech recognition.

The invention has been explained above with reference to certain preferred embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above as the preferred embodiments. Therefore, these and other variations upon the foregoing embodiments are intended to be covered by the present invention, which is limited only by the appended claims.

What is claimed is:

1. A system for implementing a speech recognition engine, comprising:
    demiphone acoustic models that said speech recognition engine utilizes to perform speech recognition procedures, said demiphone acoustic models each having three states that collectively form a preceding demiphone and a succeeding demiphone; and
    an acoustic model generator that analyzes speech context information to configure each of said demiphone acoustic models as either a succeeding-dominant demiphone acoustic model or a preceding-dominant dominant demiphone acoustic model, a contextual dominance for each demiphone state from a given one of said demiphone acoustic models being determined by analyzing predominant contextual information in a triphone decision tree corresponding to said each demiphone state.

2. A system for implementing a speech recognition engine, comprising:
    demiphone acoustic models that said speech recognition engine utilizes to perform speech recognition procedures, said demiphone acoustic models each having three states that collectively form a preceding demiphone and a succeeding demiphone; and
    an acoustic model generator that analyzes speech context information to configure each of said demiphone acoustic models as either a succeeding-dominant demiphone acoustic model or a preceding-dominant demiphone acoustic model, said speech context information being identified by decision trees that each include a series of questions, said questions each corresponding to a different acoustic speech characteristic, said questions each also being used to identify a contextual dominance characteristic corresponding to said different acoustic speech characteristic.

3. The system of claim 2 wherein said acoustic model generator analyzes all of said questions for a given demiphone model to determine a predominant contextual dominance characteristic for said given demiphone model.

4. The system of claim 2 wherein each of said three states is associated with a different one of said decision trees, each of said three states having a separate contextual dominance characteristic.

5. The system of claim 4 wherein a dominance characteristic of a middle state from said three states determines whether said demiphone acoustic models are configured as either said succeeding-dominant demiphone acoustic model or said preceding-dominant demiphone acoustic model.

6. The system of claim 2 wherein said decision trees are implemented as triphone decision trees that are based upon triphone acoustic models corresponding to said demiphone acoustic models.

7. The system of claim 6 wherein said triphone acoustic models are implemented with three triphone states that each incorporate acoustic contexts from both a preceding phone and a succeeding phone.

8. A method for implementing a speech recognition engine, comprising:
utilizing demiphone acoustic models to perform speech recognition procedures, each of said demiphone acoustic models having three states that collectively form a preceding demiphone and a succeeding demiphone; and
analyzing speech context information with an acoustic model generator to configure each of said demiphone acoustic models as either a succeeding-dominant demiphone acoustic model or a preceding-dominant demiphone acoustic model, a contextual dominance for each demiphone state from a given one of said demiphone acoustic models being determined by analyzing predominant contextual information in a triphone decision tree corresponding to said each demiphone state.

9. A method for implementing a speech recognition engine, comprising:
utilizing demiphone acoustic models to perform speech recognition procedures, each of said demiphone acoustic models having three states that collectively form a preceding demiphone and a succeeding demiphone; and
analyzing speech context information with an acoustic model generator to configure each of said demiphone acoustic models as either a succeeding-dominant demiphone acoustic model or a preceding-dominant demiphone acoustic model, said speech context information being identified by decision trees that each include a series of questions, said questions each corresponding to a different acoustic speech characteristic, said questions each also being used to identify a contextual dominance characteristic corresponding to said different acoustic speech characteristic.

10. The method of claim 9 wherein said acoustic model generator analyzes all of said questions for a given demiphone model to determine a predominant contextual dominance characteristic for said given demiphone model.

11. The method of claim 9 wherein each of said three states is associated with a different one of said decision trees, each of said three states having a separate contextual dominance characteristic.

12. The method of claim 11 wherein a dominance characteristic of a middle state from said three states determines whether said demiphone acoustic models are configured as either said succeeding-dominant demiphone acoustic model or said preceding-dominant demiphone acoustic model.

13. The method of claim 9 wherein said decision trees are implemented as triphone decision trees that are based upon triphone acoustic models corresponding to said demiphone acoustic models.

14. The method of claim 13 wherein said triphone acoustic models are implemented with three triphone states that each incorporate acoustic contexts from both a preceding phone and a succeeding phone.

* * * * *